Patented July 4, 1933

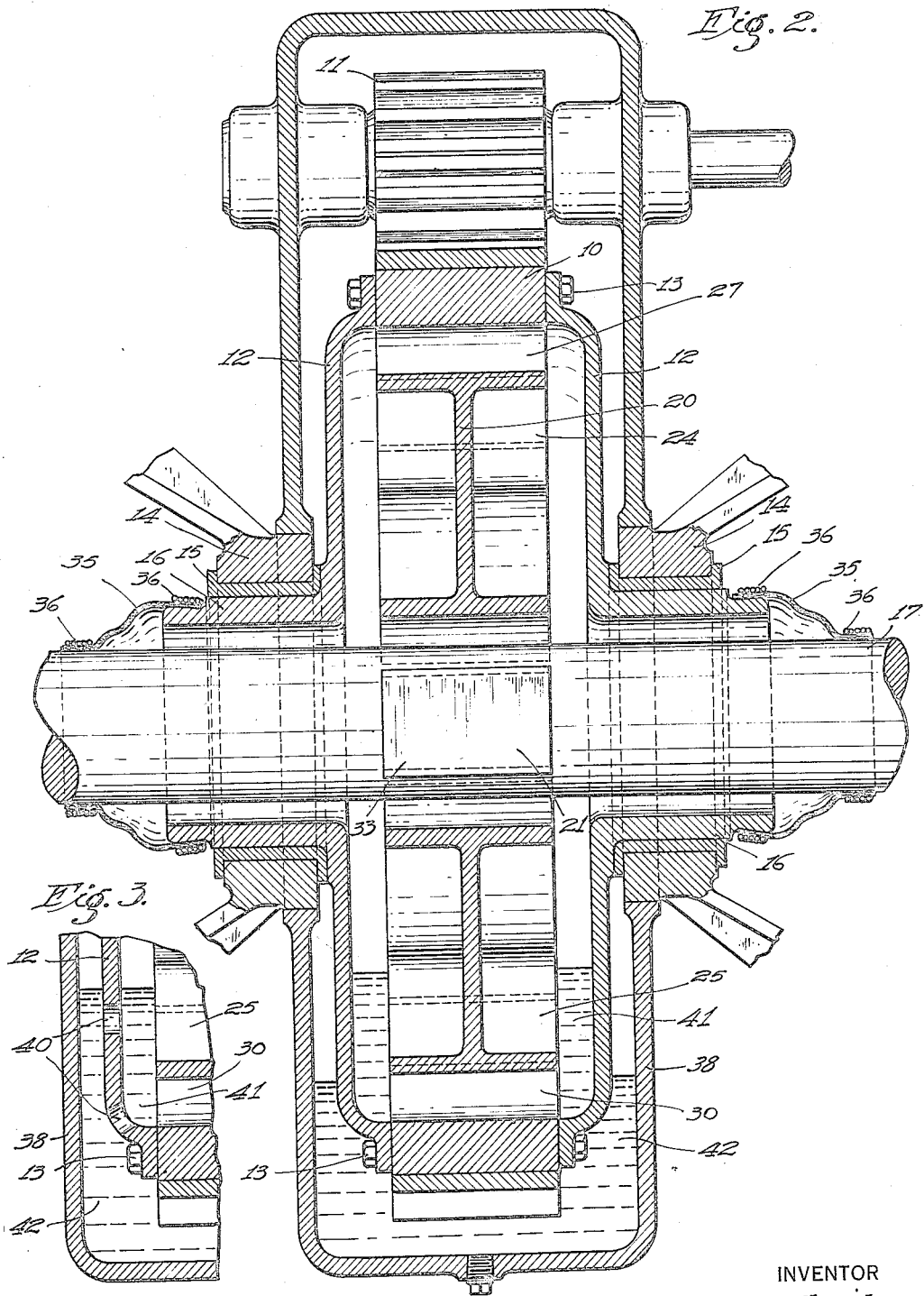

1,916,391

UNITED STATES PATENT OFFICE

JOHN P. SHAMBERGER, OF WILKINSBURG, PENNSYLVANIA, ASSIGNOR TO WESTINGHOUSE ELECTRIC & MANUFACTURING COMPANY, A CORPORATION OF PENNSYLVANIA

CENTER-AXLE DRIVE FOR LOCOMOTIVES

Application filed February 28, 1931. Serial No. 519,105.

My invention relates to drives for locomotives and more particularly to center-axle drives for locomotives.

The object of my invention, generally stated, is the provision of a locomotive drive that shall be simple and efficient in operation and be readily and economically manufactured.

A more specific object of my invention is to provide for so locating the connection that is utilized for transmitting torque from one rotatively mounted member to another that the rotatively mounted members are free to move in all directions, relative to each other, except angularly in the direction that the torque is being transmitted, and for so enclosing the torque-transmitting connection within one of the rotatively mounted members that the enclosure forms a reservoir for a lubricant to be utilized for lubricating the said torque-transmitting connection.

Other objects of the invention, will, in part, be obvious and, in part, appear hereinafter.

This invention, accordingly, is disclosed in the embodiment thereof shown in the accompanying drawings, and comprises the features of construction, the combination of elements and the arrangement of parts which will be exemplified in the construction hereinafter set forth, and the scope of the application of which will be indicated in the claims.

For a fuller understanding of the objects of the invention, reference should be had to the following detailed description, taken in connection with the accompanying drawings, in which:

Fig. 2 is a view, in vertical cross section, of a center-axle drive embodying the features of my invention and illustrating, particularly, the method employed for rotatively mounting the motor-driven gear wheel on the superstructure of the locomotive and the means utilized for providing separate lubricating reservoirs for the torque-transmitting connection and the motor-driven gear wheel.

Fig. 3 is a fragmentary view of a portion of the center-axle drive shown in Fig. 2 having openings provided in the sides of the motor-driven gear wheel in order to so connect the two separate reservoirs that one lubricant may be utilized for lubricating both the torque-transmitting connection and the motor-driven gear wheel.

Figure 1:
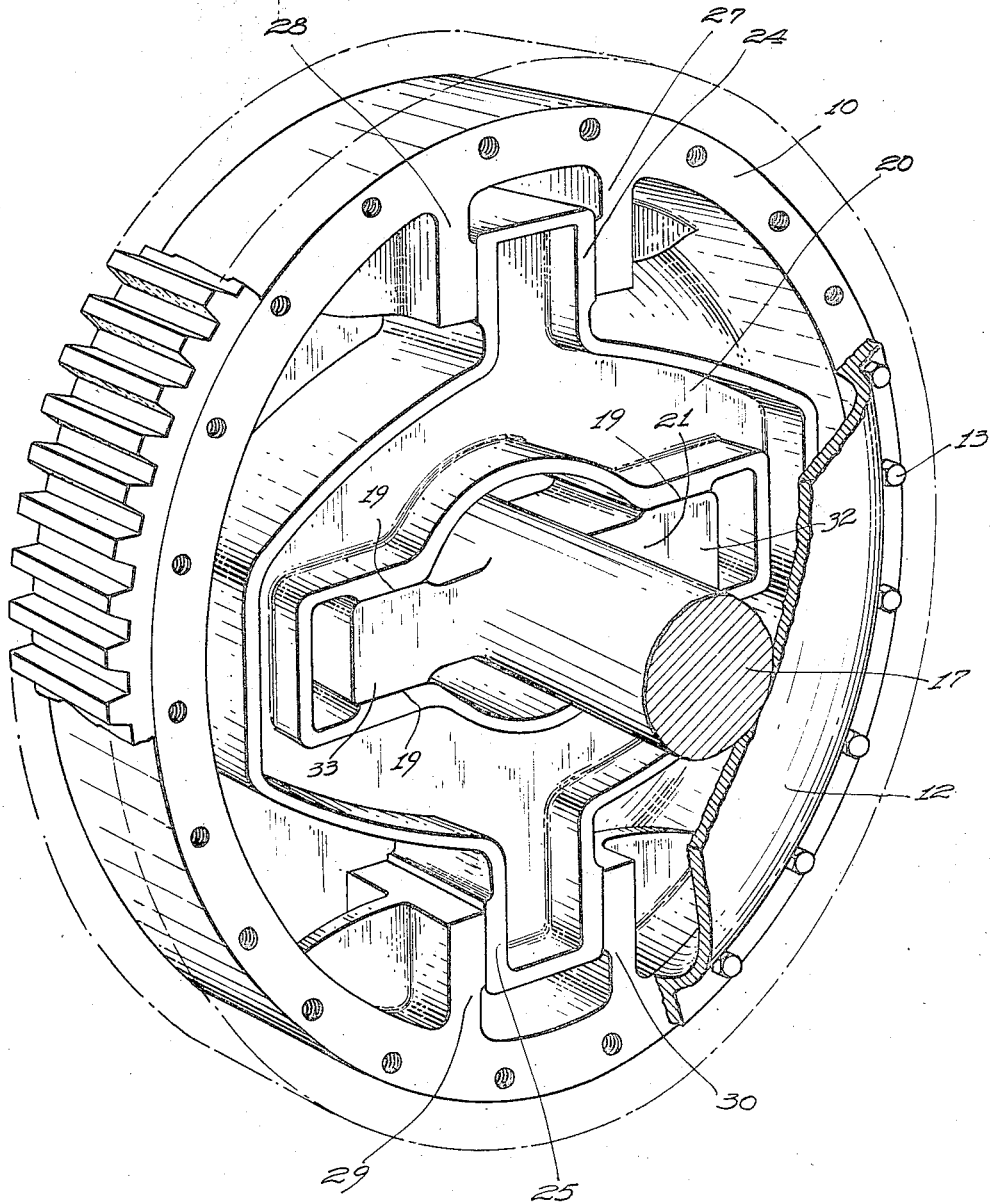
Figure 1 is a perspective view of a motor-driven gear and a portion of a wheel axle as utilized in a center-axle drive embodying the features of my invention, parts being broken away to show the arrangement of the structural elements that constitute the torque-transmitting connection.

My invention, although capable of general application, is particularly applicable to center-axle drives for locomotives.

In view of the fact that the center-axle drives for locomotives are well known to those skilled in the art, only a showing of the essential parts is included in the accompanying drawings.

Referring now to the drawings, 10 designates a motor-driven gear wheel utilized in conjunction with a center-axle drive for locomotives. Although not shown in the accompanying drawings, the gear wheel 10 is rotatively mounted in the center of the locomotive superstructure 14, intermediate the driving wheels. In order to provide for enclosing the torque-transmitting connection within the gear wheel 10 so that the enclosure may be utilized as a reservoir for a lubricant, the gear wheel, as preferable shown in the drawings, is securely mounted upon a gear center 12 by bolts 13.

The gear center 12, in view of the fact that it is desirable in my invention, to eliminate the motor-drive quill shaft that is generally utilized for rotatively mounting a motor-driven gear wheel upon the locomotive superstructure, is provided with a center portion which extends outwardly from the plane of the gear wheel 10 to provide a hub 16 for rotatively mounting the gear wheel upon the locomotive superstructure 14. The outer surface of the hub 16, for the purpose of rotatively mounting the gear wheel 10 upon the locomotive superstructure 14, is formed to provide bearing surfaces for rotating within the bearings 15.

In most center-axle drives, in order to provide for transmitting a large tractive effort to the locomotive driving wheels, the motor-driven gear wheel is so large in diameter that it occupies the space usually occupied by the driving motors in other types of drives for locomotives. As will be observed in Fig. 2, only one motor-driven pinion 11 is shown, but, in most center-axle drives, especially in those provided to transmit large tractive efforts, from one to six motor-driven pinions are provided.

In order that the space in the cab of the locomotive may be utilized economically, such provision is made when more than one motor-driven pinion is provided, that the face of the motor-driven gear wheel shall be wide enough to accommodate two pinions 11 disposed end-to-end about the same longitudinal axis. As will be noted by this arrangement, small high-speed motors may be utilized with center-axle drives for transmitting a large tractive effort, instead of utilizing large slow-speed motors, as is generally done in other types of locomotive drives.

Referring again to the drawings, 17 represents a wheel axle, of which only a center portion is shown, which is disposed to extend through the hub portion 16 of the gear center 12. The ends of the axle are so rotatively mounted in its journal bearings that longitudinal movement of the axle relative to the gear wheel 10 is limited (not shown).

In view of the fact that the locomotive superstructure 14 is resiliently supported by springs that are mounted on the axle journal bearings, the gear wheel 10 will move relatively to the axle 17 when the springs that support the locomotive superstructure 14 are being compressed and expanded. Accordingly, because of this fact, provision is made to provide sufficient clearance between the outside diameter of the axle and the inside diameters of the hub 16. However, when the springs that support the locomotive superstructure 14, are compressed to their lower limit, the inside surface of the hub 16 will ride on the axle 17.

As hereinbefore stated, my invention resides in providing a torque-transmitting connection for the gear wheel 10 and the axle 17 that permits relative movement in all directions, except angularly in the direction that the torque is being transmitted, and for so enclosing the torque-transmitting connection within the gear wheel 10 that the enclosure forms a reservoir for a lubricant utilized for lubricating the torque-transmitting connection.

As best shown in Fig. 1, the torque-transmitting connection comprises a yoke 20 slidably connected to the gear wheel 10 and a driving arm 21 slidably connected to the yoke 20. The yoke 20 is provided with two projections 24 and 25 that extend radially outward therefrom and disposed 180° apart. The projection 24 is slidably connected to the gear wheel 10 by being disposed intermediate two parallel spaced projections 27 and 28 which are formed integrally with the gear wheel. Similarly, the projection 25 of the yoke 20 is slidably connected to the gear wheel 10 by being disposed intermediate two parallel spaced projections 29 and 30 which are also formed integrally with the gear wheel. The two parallel spaced projections 29 and 30 are disposed on the gear wheel diametrically opposite to the two parallel spaced projections 27 and 28.

It will be observed from Fig. 1, that in order to prevent shoulders forming on the wearing surfaces of the projections, the space adjacent to the gear wheel 10 between the two parallel spaced projections 27 and 28 and the two parallel spaced projections 29 and 30 is somewhat enlarged.

The center portion of the yoke 20, in order to provide for slidably connecting it to the driving arm 21, is provided with a rectangular opening. By reason of the fact that the gear wheel 10 moves laterally relative to the axle 17, the middle portion of the longer side of the rectangular opening is somewhat curved outwardly to provide sufficient clearance to prevent the yoke 20 from riding on the axle.

The remaining portion of the longer sides of the rectangular opening are shaped to provide parallel wearing surfaces 19 between which are slidably mounted the ends 32 and 33 of the driving arm 21 which is formed integrally with the axle 17. It will be observed, likewise, from Fig. 1, that in order to prevent shoulders forming on the wearing surfaces 19 of the yoke 20, the space adjacent to the ends of the rectangular opening in the yoke is somewhat enlarged.

The mass of the yoke 20, because of the fact that it will be somewhat dynamically unbalanced when the gear wheel 10 and the axle 17 are rotating about different axes, is made light in order to keep the magnitude of the unbalanced centrifugal forces to a minimum. Although the mass of the yoke 20 is light, the structure is of such shape that it has ample strength to transmit torque of great magnitude from the gear wheel 10 to the axle 17.

As best shown in Fig. 2, the gear center 12, when bolted to the gear wheel 10, forms an enclosure which is utilized for containing a lubricant for lubricating the torque-transmitting connection. However, in order to prevent any of the lubricant from escaping from the clearance provided between the axle 17 and the hub 16, boots 35 are provided. Each of the boots 35 is disposed to have one end connected to the hub 16 and the other end extending outwardly to surround the axle. Any suitable means, such as straps 36, may be provided to secure the boots to the hub 16 and to the axle 17.

In order that the gear wheel 10 may be separately lubricated from the torque-transmitting connection, a gear case 38, as shown in Fig. 2, is provided. The gear case 38 is carried by the locomotive superstructure 14. Generally, the lubricant that is best adapted for a motor-driven gear wheel is of a different grade than that best adapted for the torque-transmitting connection, and, because of this fact, the lubricants are maintained in separate reservoirs 41 and 42, as shown in Fig. 2.

However, in case it is desirable to use the same grade of lubricant for lubricating the torque-transmitting connection and the motor-driven gear wheel, openings 40, as shown in Fig. 3, are provided in the sides of the gear center 12. The openings 40 connect the lubricating reservoir 41 to the lubricating reservoir 42 so that the same lubricant may be utilized for the torque-transmitting connections and the motor-driven gear wheel.

In operation, it will be observed that the torque-transmitting connection, which comprises the yoke 20 slidably connected to the gear wheel 10 and the driving arm 21 slidably mounted in the yoke, permits relative movements between the axle 17 and the gear wheel 10 in all directions except angularly in the direction that the torque is being transmitted.

While the illustrated example constitutes a practical embodiment of my invention, I do not limit myself strictly to the exact details herein illustrated, since the structure may be considerably varied without departing from the spirit of the invention, as defined by the appended claims.

I claim as my invention:

1. A torque-transmitting connection for a locomotive center-gear drive comprising, in combination, a motor driven gear wheel rotatively mounted in the locomotive superstructure, a rotatively mounted wheel axle extending through said gear wheel, a yoke surrounding the axle and slidably connected to the gear wheel, a driving arm connected to the wheel axle, means for so slidably connecting the said yoke and the said driving arm that the said gear wheel and said axle are permitted to move relative to each other in all directions, except in the direction in which the torque is being transmitted, means carried by the motor-driven gear wheel for enclosing the said yoke and the said arm within said gear wheel, said enclosing means forming a reservoir within said gear wheel for a lubricant to be utilized for lubricating the slidable connections of the yoke and the driving arm, and means carried by the locomotive superstructure for enclosing the said second-mentioned motor-driven gear wheel, said enclosing means forming a separate reservoir for a lubricant to be utilized for lubricating the motor-driven gear wheel independently of the slidable connections of the yoke and the driving arm.

2. A torque-transmitting connection for a locomotive center-gear drive comprising, in combination, a motor-driven gear wheel rotatively mounted in the locomotive superstructure, a rotatively mounted wheel axle extending through said gear wheel, torque transmitting means within the gear wheel for so connecting the gear wheel and the wheel axle that they are permitted to move relative to each other in all directions, except in the direction that the torque is being transmitted, means carried by the motor driven gear wheel for enclosing the said torque-transmitting connection within said gear wheel, said enclosing means forming a reservoir within said gear wheel for a lubricant to be utilized for lubricating the torque-transmitting connection, and means carried by the locomotive superstructure for enclosing the said second-mentioned motor-driven gear wheel, said enclosing means forming a separate reservoir for a lubricant to be utilized for lubricating the motor-driven gear wheel independently of the torque-transmitting connection.

3. A torque-transmitting connection for a locomotive center-gear drive comprising, in combination, a motor-driven gear wheel rotatively mounted in the locomotive superstructure, a rotatively mounted wheel axle extending through said gear wheel, a yoke surrounding the axle and slidably connected to the said gear wheel, a driving arm connected to the wheel axle, means for so slidably connecting the said yoke and said driving arm that the said gear wheel and said wheel axle are permitted to move relative to each other in all directions, except in the direction in which the torque is being transmitted, and means carried by the locomotive superstructure and the motor driven gear wheel for enclosing the said gear wheel and said yoke and driving arm, said enclosing means forming a reservoir for a lubricant to be utilized for lubricating both the motor-driven gear wheel and the said yoke and driving arm.

4. A torque-transmitting connection for a locomotive center-gear drive comprising, in combination, a motor-driven gear wheel having a hub forming a bearing surface, means for rotatively mounting said hub in the locomotive superstructure, a rotatively mounted wheel axle extending through said hub, torque transmitting means within the gear wheel for so connecting the motor-driven gear wheel and the wheel axle that they are permitted to move relative to each other in all directions, except in the direction that the torque is being transmitted, means carried by the motor-driven gear wheel for enclosing the said torque-transmitting connection within said gear wheel, said enclosing means forming a reservoir for a lubricant to be utilized for lubricating the torque-transmitting connection, and means carried by the locomotive superstructure for enclosing the said motor-driven gear wheel, said second-mentioned enclosing means forming a separate reservoir for a lubricant to be utilized for lubricating the motor-driven gear wheel independently of the torque-transmitting connection.

5. A torque-transmitting connection for a locomotive center-gear drive comprising, in combination, a motor-driven gear wheel having a hub forming a bearing surface, means for rotatively mounting said hub in the locomotive superstructure, a rotatively mounted wheel axle extending through said hub, a yoke surrounding the axle and slidably connected to the motor-driven gear wheel, a driving arm connected to the wheel axle, means for so slidably connecting the said yoke and the driving arm that the said gear wheel and said wheel axle are permitted to move relative to each other in all directions, except in the direction that the torque is being transmitted, means carried by the motor-driven gear wheel for enclosing the said yoke and driving arm within said gear wheel, said enclosing means forming a reservoir within said gear wheel for a lubricant to be utilized for lubricating the said yoke and driving arm, and means carried by the locomotive superstructure for enclosing the said motor-driven gear wheel, said second-mentioned enclosing means forming a separate reservoir for a lubricant to be utilized for lubricating the motor-driven gear wheel independently of the said yoke and driving arm.

6. A torque-transmitting connection for a locomotive center-gear drive comprising, in combination, a motor-driven gear wheel having a hub forming a bearing surface, means for rotatively mounting said hub in the locomotive superstructure, a rotatively mounted wheel axle extending through said hub, a yoke surrounding the axle and slidably connected to the motor-driven gear wheel, a driving arm connected to the wheel axle, means for so slidably connecting the said yoke and the driving arm that the said motor-driven gear wheel and the wheel axle are permitted to move relative to each other in all directions, except in the direction that the torque is being transmitted, and means carried by the locomotive superstructure and the motor-driven gear wheel for enclosing the said gear wheel and the said yoke and driving arm, said enclosing means forming a reservoir for a lubricant to be utilized for lubricating both the motor-driven gear wheel and the said yoke and driving arm.

In testimony whereof, I have hereunto subscribed my name this 17th day of February, 1931.

JOHN P. SHAMBERGER.